(12) United States Patent
Yano et al.

(10) Patent No.: US 8,969,441 B2
(45) Date of Patent: Mar. 3, 2015

(54) CATIONIC MICROFIBRILLATED PLANT FIBRE AND MANUFACTURING METHOD FOR SAME

(75) Inventors: Hiroyuki Yano, Uji (JP); Tadafumi Hashimoto, Uji (JP); Akihiro Sato, Uji (JP); Antonio Norio Nakagaito, Uji (JP); Kazuo Kitagawa, Kyoto (JP); Takeshi Semba, Otokuni-gun (JP); Akihiro Ito, Kyoto (JP)

(73) Assignees: Nippon Paper Industries Co., Ltd., Tokyo (JP); Oji Holdings Corporation, Tokyo (JP); Kyoto University, Kyoto-shi (JP)

( * ) Notice: Subject to any disclaimer, the term of this patent is extended or adjusted under 35 U.S.C. 154(b) by 0 days.

(21) Appl. No.: 13/574,883

(22) PCT Filed: Feb. 4, 2011

(86) PCT No.: PCT/JP2011/052405
§ 371 (c)(1),
(2), (4) Date: Sep. 14, 2012

(87) PCT Pub. No.: WO2011/096529
PCT Pub. Date: Aug. 11, 2011

(65) Prior Publication Data
US 2013/0005869 A1 Jan. 3, 2013

(30) Foreign Application Priority Data

Feb. 5, 2010 (JP) ................. 2010-024482

(51) Int. Cl.
*C08L 1/26* (2006.01)
*D21H 11/22* (2006.01)
*C08B 11/145* (2006.01)
*D06M 13/463* (2006.01)

(52) U.S. Cl.
CPC .............. *D21H 11/22* (2013.01); *C08B 11/145* (2013.01); *D06M 13/463* (2013.01)
USPC ................................ 524/43; 536/43; 8/181

(58) Field of Classification Search
USPC .................................. 536/43; 8/181; 524/43
See application file for complete search history.

(56) References Cited

U.S. PATENT DOCUMENTS 8,029,896 B2 * 10/2011 Kumamoto et al. .......... 428/393
2012/0277351 A1 * 11/2012 Yano et al. ..................... 524/35

FOREIGN PATENT DOCUMENTS

| JP | 08-010284 A | 1/1996 |
|---|---|---|
| JP | 2002-226501 A | 8/2002 |
| JP | 2005-299069 A | 10/2005 |
| JP | 2007-231438 A | 9/2007 |
| JP | 2008-034556 A | 2/2008 |
| JP | 2008-075214 A | 4/2008 |
| JP | 2008-308802 A | 12/2008 |
| JP | 2009-019200 A | 1/2009 |
| JP | 2009-102782 A | 5/2009 |
| JP | 2009-299043 A | 12/2009 |
| WO | WO-01/66600 A1 | 9/2001 |
| WO | WO 2009020239 A1 * | 2/2009 |

OTHER PUBLICATIONS

TAPPI test method, "Acid-insoluble lignin in wood and pulp," Jun. 16, 2006.*
ZSK twin screw extruder. http://www.coperion.com/en/compounding-extrusion/machines-systems/zsk-series/. Accessed on Jan. 2, 2014.*
International Search Report dated May 17, 2011, issued for PCT/JP2011/052405.

* cited by examiner

*Primary Examiner* — Liam J Heincer
*Assistant Examiner* — Nicholas Hill
(74) *Attorney, Agent, or Firm* — Locke Lord LLP; James E. Armstrong, IV; Nicholas J. DiCeglie, Jr.

(57) ABSTRACT

The present invention provides a novel cationized microfibrillated plant fiber and a method for manufacturing the same. A cationic microfibrillated plant fiber that is cationically modified with a quaternary-ammonium-group-containing compound, and that has an average diameter of 4 to 200 nm.

5 Claims, 3 Drawing Sheets

CATIONIC MICROFIBRILLATED PLANT FIBRE AND MANUFACTURING METHOD FOR SAME

TECHNICAL FIELD

The present invention relates to a cationic microfibrillated plant fiber and a method for manufacturing the same.

BACKGROUND ART

Various methods are known for microfibrillating plant fibers or the like (e.g., wood pulp) to obtain microfibrillated plant fibers (nanofibers) that are refined to have a nano-order fiber diameter. For example, Patent Literature 1 discloses that by microfibrillating a cellulose fiber having a specific fiber length, a microfibrillated cellulose having excellent water retentivity and a long fiber length can be obtained despite a small fiber diameter. Patent Literature 2 suggests a method for enhancing nanofibrillation, in which the adhesive property of unnecessary lignin, hemicellulose, and the like, contained in a cellulose-based fiber raw material is diminished by subjecting the fiber raw material to steaming treatment. Further, as a method for directly producing a cellulose nanofiber from lignocellulose by enhancing nanofibrillation, Patent Literature 3 suggests a method for treating lignocellulose in an aqueous-based medium containing a nitroxy radical derivative, alkali bromide, and an oxidizing agent.

Patent Literature 4 discloses a method for improving the water absorption property of fiber for use in disposable diapers and the like, in which a hydrophobized drug such as an anionic surfactant, cationic surfactant, or nonionic surfactant is added to a cellulose-based fiber, and then the mixture is subjected to mechanical stirring to provide the cellulose-based fiber with a high porosity. As in Patent Literature 4, although the production of microfibrils as small as microfibrillated plant fibers (nanofibers) is not intended, Patent Literature 5 suggests increasing the affinity with an anionic dye by introducing a cationic group into the surface of a cellulose-based fiber to cationically charge the fiber surface, and improving the water retentivity, shape retention property, and dispersibility of cellulose particles, while maintaining functions as the cellulose particles obtained by further refining the cellulose-based fiber.

CITATION LIST

Patent Literature

PTL 1: Japanese Unexamined Patent Publication No. 2007-231438
PTL 2: Japanese Unexamined Patent Publication No. 2008-75214
PTL 3: Japanese Unexamined Patent Publication No. 2008-308802
PTL 4: Japanese Unexamined Patent Publication No. 1996-10284
PTL 5: Japanese Unexamined Patent Publication No. 2002-226501

SUMMARY OF INVENTION

Technical Problem

A main object of the present invention is to provide a novel cationized microfibrillated plant fiber and a method for manufacturing the same.

Solution to Problem

As described above, in producing a microfibrillated plant fiber from a plant fiber such as wood pulp, modifying a starting material or a defibration method to enhance nanofibrillation and subjecting a raw material fiber to a chemical treatment to improve water retentivity have been known. However, fiber that is highly refined even to a microfibrillated plant fiber has different levels of fiber dispersibility or surface damage depending on a defibration method or chemical treatment method, and this leads to a great difference in the properties, e.g., strength of a sheet or a resin composite obtained from the microfibrillated plant fiber. The present inventors conducted extensive research on a method for easily producing a microfibrillated plant fiber from a plant-fiber-containing material, wherein the obtained microfibrillated plant fiber has excellent strength. Consequently, they found that by employing a production method comprising the steps of (1) reacting hydroxyl groups in a material containing a cellulose fiber with a quaternary-ammonium-group-containing cationization agent to cationically modify the cellulose-fiber-containing material, and (2) defibrating the obtained cationically modified fiber in the presence of water, a plant fiber can be easily defibrated, and a microfibrillated plant fiber having particularly excellent strength when the fiber is formed into a sheet or a resin composite can be obtained.

In general, a microfibrillated plant fiber is slightly anionically charged because of reasons such as the reducing terminal being partially oxidized. Therefore, by merely subjecting plant fiber to cationic modification, bonding between fibers is enhanced by electrostatic interaction, which may increase strength. However, since the amount of the anionic group contained in the plant fiber is very small, its effect is poor. As a result of extensive study, however, the present inventors found that micro-fibrillation can significantly proceed by applying mechanical shear stress to a plant fiber that has been cationically modified.

The present invention was accomplished as a result of further research based on these findings. Specifically, the present invention provides a microfibrillated plant fiber, manufacturing method thereof, sheet containing the plant fiber, and thermosetting resin composite containing the plant fiber, as shown in the following Items 1 to 7.

1. A cationic microfibrillated plant fiber cationically modified with a quaternary-ammonium-group-containing compound, the cationic microfibrillated plant fiber having an average diameter of 4 to 200 nm.
2. A cationic microfibrillated plant fiber having a degree of substitution of quaternary ammonium groups of not less than 0.03 to less than 0.4 per anhydrous glucose unit and an average diameter of 4 to 200 nm.
3. A method for manufacturing the cationic microfibrillated plant fiber of Item 1 or 2, the method comprising the steps of
   (1) reacting hydroxyl groups in a material containing a cellulose fiber with a quaternary-ammonium-group-containing cationization agent to cationically modify the material containing a cellulose fiber, and
   (2) defibrating a resulting cationically modified fiber in the presence of water to an extent that a fiber average diameter becomes 4 to 200 nm.
4. A sheet comprising the cationic microfibrillated plant fiber of Item 1 or 2.
5. A thermosetting resin composite comprising the cationic microfibrillated plant fiber of Item 1 or 2.

6. The thermosetting resin composite according to Item 5, wherein the thermosetting resin is an unsaturated polyester resin or a phenol resin.
7. A method for manufacturing a thermosetting resin composite, comprising the step of mixing the cationic microfibrillated plant fiber of Item 1 or 2 with a thermosetting resin.

Advantageous Effects of Invention

By employing the manufacturing method comprising the steps of (1) reacting hydroxyl groups in a material containing a cellulose fiber with a quaternary-ammonium-group-containing cationization agent to cationically modify the material containing a cellulose fiber, and (2) defibrating the obtained cationically modified fiber in the presence of water, the present invention can attain excellent effects such that a raw material is easily defibrated, and significantly high strength when the obtained microfibrillated plant fiber is formed into a sheet or a resin composite can be attained. Further, the microfibrillated plant fiber of the present invention has an average diameter as extremely small as about 4 to 200 nm, and it has excellent strength. Accordingly, the present invention is applicable to a wide variety fields including interior materials, exterior materials, and structural materials of transportation vehicles; the housings, structural materials, and internal parts of electrical appliances; the housings, structural materials, and internal parts of mobile communication equipment; the housings, structural materials, and internal parts of devices such as portable music players, video players, printers, copiers, and sporting equipment; building materials; and office supplies such as writing supplies.

Hereinbelow, details are given on the present inventions, i.e., a cationic microfibrillated plant fiber, a method for manufacturing the plant fiber, and a sheet and a thermosetting resin composite obtained from the plant fiber.

One feature of the cationic microfibrillated plant fiber of the present invention is that the plant fiber is extremely thin, having an average diameter of about 4 to 200 nm, and the microfibrillated plant fiber is cationically modified with a quaternary-ammonium-group-containing compound.

In plant cell walls, a cellulose microfibril (single cellulose nanofiber) having a width of about 4 nm is present as the minimum unit. This is a basic skeleton material (basic element) of plants, and the assembly of such cellulose microfibrils forms a plant skeleton. In the present invention, the microfibrillated plant fiber is obtained by breaking apart the fibers of a plant-fiber-containing material (e.g., wood pulp) to a nanosize level.

The average diameter of the cationic microfibrillated plant fiber of the present invention is generally about 4 to 200 nm, preferably about 4 to 150 nm, and particularly preferably about 4 to 100 nm. The average diameter of the cationic microfibrillated plant fiber of the present invention is an average value obtained by measuring at least 50 cationic microfibrillated plant fibers in the field of an electron microscope.

The microfibrillated plant fiber of the present invention can be produced, for example, by a method including the following steps (1) and (2).

(1) Reacting hydroxyl groups in a material containing a cellulose fiber with a quaternary-ammonium-group-containing cationization agent to cationically modify the material containing a cellulose fiber, and (2) defibrating the obtained cationically modified fiber in the presence of water to an extent that the fiber has an average diameter of 4 to 200 nm.

Examples of the material containing a cellulose fiber (cellulose-fiber-containing material), which is used as a raw material in step (1), include pulp obtained from a natural cellulose raw material such as wood, bamboo, hemp, jute, kenaf, cotton, beat, agricultural waste, and cloth; mercerized cellulose fiber; and regenerated cellulose fiber such as rayon and cellophane. In particular, pulp is a preferable raw material.

Preferable examples of the pulp include chemical pulp (kraft pulp (KP), sulfite pulp (SP)), semi-chemical pulp (SCP), semi-ground pulp (CGP), chemi-mechanical pulp (CMP), ground pulp (GP), refiner mechanical pulp (RMP), thermomechanical pulp (TMP), and chemi-thermomechanical pulp (CTMP), which are obtained by chemically and/or mechanically pulping plant raw materials; and deinked recycled pulp, cardboard recycled pulp, and magazine recycled pulp, which comprise these plant fibers as main ingredients. These raw materials may optionally be subjected to delignification or bleaching to control the lignin content in the plant fibers.

Among these pulps, various kraft pulps derived from softwood with high fiber strength (softwood unbleached kraft pulp (hereafter sometimes referred to as NUKP), oxygen-prebleached softwood kraft pulp (hereafter sometimes referred to as NOKP), and softwood bleached kraft pulp (hereafter sometimes referred to as NBKP) are particularly preferably used.

The lignin content in the cellulose-fiber-containing material used as a raw material is generally about 0 to 40% by weight, and preferably about 0 to 10% by weight. The lignin content is the value measured by the Klason method.

The cation modification reaction (reaction of hydroxyl groups in a cellulose-fiber-containing material with a quaternary-ammonium-group-containing cationization agent) in step (1) can be performed by a known method. The cellulose-fiber-containing material is formed by binding a large number of anhydrous glucose units, and each anhydrous glucose unit contains multiple hydroxy groups. For example, when glycidyl trialkyl ammonium halide is used as a cationization agent, the cationization agent and a catalyst, i.e., a hydroxylation alkali metal, are reacted with a cellulose-fiber-containing material, which is used as a raw material.

The quaternary-ammonium-group-containing cationization agent that acts on (reacts with) the cellulose-fiber-containing material is a compound that contains quaternary ammonium groups and a group reacting with hydroxyl groups in the cellulose-fiber-containing material. The group reacting with hydroxyl groups in the cellulose-fiber-containing material is not particularly limited as long as it is a reaction group that reacts with hydroxyl groups to form a covalent bond. Examples thereof include epoxy, halohydrin capable of forming epoxy, active halogen, active vinyl, methylol, and the like. Of these, epoxy and halohydrin forming epoxy are preferable in view of reactivity. Further, quaternary ammonium groups have a structure of —$N^+(R)_3$. (Note that R in the formula is an alkyl group, an aryl group, or a heterocyclic group, each of which may optionally have a substituent.) Various cationization agents are known as such cationization agents, and known cationization agents can be used in the present invention.

In the present invention, the molecular weight of the quaternary-ammonium-group-containing cationization agent is generally about 150 to 10,000, preferably about 150 to 5,000, and more preferably about 150 to 1,000. When the molecular weight of the cationization agent is 1,000 or less, defibration of the cellulose-fiber-containing material easily proceeds; a cationization agent having a molecular weight of 1,000 or less is thus preferable. Defibration easily proceeds presumably because a cationization agent permeates into the cellulose, and even the inside of the cellulose-fiber-containing material is fully cationized to increase the effect of electric resistance of cations.

Examples of the quaternary ammonium-containing cationization agent used in the present invention include glycidyl trimethylammonium chloride, 3-chloro-2-hydroxypropyl trimethyl ammonium chloride, and like glycidyl trialkyl ammonium halides, or halohydrin thereof.

The reaction of the cellulose-fiber-containing material and the quaternary-ammonium-group-containing cationization agent is preferably performed in the presence of a hydroxylation alkali metal and water and/or a $C_{1-4}$ alcohol. Examples of the hydroxylation alkali metal, which is used as a catalyst, include sodium hydroxide, potassium hydroxide, and the like. Examples of the water include tap water, purified water, ion exchange water, pure water, industrial water, and the like. Examples of the $C_{1-4}$ alcohol include methanol, ethanol, n-propyl alcohol, isopropyl alcohol, n-butanol, and the like. Water and $C_{1-4}$ alcohol can be used singly or as a mixture. When water and $C_{1-4}$ alcohol are used as a mixture, the composition ratio is suitably adjusted. It is desirable to adjust the degree of substitution of quaternary ammonium groups of the obtained cationic microfibrillated plant fiber to not less than 0.03 to less than 0.4 per anhydrous glucose unit.

The proportion of the cellulose-fiber-containing material and the cationization agent used in step (1) may be generally such that the cationization agent is contained in an amount of about 10 to 1,000 parts by weight, preferably about 10 to 800 parts by weight, and more preferably about 10 to 500 parts by weight per 100 parts by weight of the cellulose-fiber-containing material.

Further, the proportion of the hydroxylation alkali metal is generally about 1 to 7 parts by weight, preferably about 1 to 5 parts by weight, and more preferably about 1 to 3 parts by weight per 100 parts by weight of the cellulose-fiber-containing material. Further, the proportion of water and/or $C_{1-4}$ alcohol is generally about 100 to 50,000 parts by weight, preferably 100 to 10,000 parts by weight, and more preferably about 100 to 500 parts by weight per 100 parts by weight of the cellulose-fiber-containing material.

In step (1), the cellulose-fiber-containing material is reacted with the cationization agent generally at about 10 to 90° C., preferably at about 30 to 90° C., and more preferably at about 50 to 80° C. Additionally, the cellulose-fiber-containing material is reacted with the cationization agent for generally about 10 minutes to 10 hours, preferably 30 minutes to 5 hours, and more preferably about 1 to 3 hours. The pressure for performing step (1) is not particularly limited, and step (1) may be performed under atmospheric pressure.

The cellulose-fiber-containing material that is cationically modified in step (1) may be subjected to step (2) without further treatment; however, it is preferable that after cation modification in step (1), a component such as a alkali metal hydroxide salt that remains in the reaction system be neutralized with a mineral acid, organic acid, etc., and then be subjected to step (2). Further, in addition to the neutralization step, washing and purification may be performed by a known method. Additionally, the amount of water may be increased or decreased to obtain a fiber concentration appropriate for the subsequent defibration treatment in step (2).

However, in the present invention, the cellulose-fiber-containing material that is cationically modified should not be dried between step (1) and step (2). If the cellulose-fiber-containing material cationically modified in step (1) is dried, even when the dried product is defibrated in subsequent step (2), it becomes difficult to obtain a microfibrillated plant fiber that is defibrated to the nano level and has a high strength, as in the present invention. Since a cellulose molecule has a large number of hydroxyl groups, adjacent fibers of the cellulose-fiber-containing material that has undergone the drying step are bonded to each other by firm hydrogen bonding and are firmly agglomerated (for example, such agglomeration of fibers during drying is called "hornification" in paper and pulp). It is extremely difficult to defibrate fibers once agglomerated using mechanical power. For example, in Patent Literature 5, hornification occurs because drying is performed after cationization treatment. Accordingly, even if a material containing a hornificated cellulose fiber is mechanically broken by using any method, micro-order particles alone are merely formed.

Accordingly, in the present invention, the cellulose-fiber-containing material that is cationically modified in step (1) is defibrated in the presence of water in step (2). A known method can be employed as a method of defibrating the cellulose-fiber-containing material. For example, a defibration method can be used in which an aqueous suspension or slurry of the cellulose-fiber-containing material is mechanically milled or beaten using a refiner, high-pressure homogenizer, grinder, single- or multi-screw kneader, or the like. It is preferable to perform treatment by combining the aforementioned defibration methods, e.g., performing a single- or multi-screw kneader treatment after a refiner treatment, as necessary.

In step (2), the cellulose-fiber-containing material that is cationically modified in step (1) is preferably defibrated by using a single- or multi-screw kneader (hereinbelow, sometimes simply referred to as a "kneader"). Examples of the kneader (kneading extruder) include a single-screw kneader and a multi-screw kneader having two or more screws. In the present invention, either can be used. The use of the multi-screw kneader is preferable because the dispersion property of the microfibrillated plant fiber can be improved. Among multi-screw kneaders, a twin-screw kneader is preferable because it is readily available.

The lower limit of the screw circumferential speed of the single- or multi-screw kneader is generally about 45 m/min. The lower limit of the screw circumferential speed is preferably about 60 m/min., and particularly preferably about 90 m/min. The upper limit of the screw circumferential speed is generally about 200 m/min., preferably about 150 m/min., and particularly preferably about 100 m/min.

The L/D (the ratio of the screw diameter D to the kneader length L) of the kneader used in the present invention is generally from about 15 to 60, and preferably from about 30 to 60.

The defibration time of the single- or multi-screw kneader varies depending on the kind of the cellulose-fiber-containing material, the L/D of the kneader, and the like. When the L/D is in the aforementioned range, the defibration time is generally from about 30 to 60 minutes, and preferably from about 30 to 45 minutes.

The number of defibration treatments (passes) using a kneader varies depending on the fiber diameter and the fiber length of the target microfibrillated plant fiber, the L/D of a kneader, or the like; however, it is generally about 1 to 8 times, and preferably about 1 to 4 times. When the number of defibration treatments (passes) of pulp using a kneader is too large, cellulose becomes discolored or heat-damaged (sheet strength decreased) because heat generation simultaneously occurs, although defibration proceeds further.

The kneader includes one or more kneading members, each having a screw.

When there are two or more kneading members, one or more blocking structures (traps) may be present between kneading members. In the present invention, since the screw circumferential speed is 45 m/min. or more, which is much higher than the conventional screw circumferential speed, to decrease the load to the kneader, it is preferable not to include the blocking structure.

The rotation directions of the two screws that compose a twin-screw kneader are either the same or different. The two screws composing a twin-screw kneader may be complete intermeshing screws, incomplete intermeshing screws, or non-intermeshing screws. In the defibration of the present invention, complete intermeshing screws are preferably used.

The ratio of the screw length to the screw diameter (screw length/screw diameter) may be from about 20 to 150. Examples of the twin-screw kneader include KZW produced by Technovel Ltd., TEX produced by the Japan Steel Works Ltd., TEM produced by Toshiba machine Co. Ltd., ZSK produced by Coperion GmbH, and the like.

The proportion of the raw material pulp in the mixture of water and the raw material pulp subjected to defibration is generally about 10 to 70% by weight, and preferably about 20 to 50% by weight.

The temperature in the kneading is not particularly limited. It is generally 10 to 160° C., and particularly preferably 20 to 140° C.

As described above, in the present invention, the plant-fiber-containing material that is cationized may be subjected to preliminary defibration using a refiner, etc., before being defibrated in step (2). A conventionally known method can be used as a method of preliminary defibration using a refiner, etc. By performing preliminary defibration using a refiner, the load applied to the kneader can be reduced, which is preferable from the viewpoint of production efficiency.

The cationic microfibrillated plant fiber of the present invention can be obtained by the aforementioned production method. The degree of substitution of quaternary ammonium groups per anhydrous glucose unit is not less than 0.03 to less than 0.4, and the degree of crystallinity of the cellulose I is generally 60% or more. The lower limit of the degree of substitution of quaternary ammonium groups per anhydrous glucose unit is preferably about 0.03, and more preferably about 0.05. The upper limit of the degree of substitution is preferably about 0.3, and more preferably about 0.2. The degree of substitution varies depending on a defibration treatment method. To adjust the degree of substitution to the aforementioned range, the aforementioned defibration methods can be used. Among these, the use of a kneader, in particular a twin-screw kneader, is particularly preferable to adjust the degree of substitution to the desired numerical range. The degree of substitution of quaternary ammonium (cation) groups is the value measured by the method according to the Example.

The lignin content of the cationic microfibrillated plant fiber of the present invention is the same as the lignin content of the raw material, i.e., the cellulose-fiber-containing material, and is generally about 0 to 40% by weight, and preferably about 0 to 10% by weight. The lignin content is the value measured by the Klason method.

To obtain a microfibrillated plant fiber having high strength and a high elastic modulus in the present invention, a cellulose composing the microfibrillated plant fiber preferably includes a cellulose I crystal structure having the highest strength and the highest elastic modulus.

The cationic microfibrillated plant fiber of the present invention can be formed into a sheet-like shape. The molding method is not particularly limited. For example, a mixture (slurry) of water and a microfibrillated plant fiber, which is obtained in step (1) and step (2), is filtered by suction, and a sheet-like microfibrillated plant fiber is dried and hot-pressed on a filter to thereby mold the microfibrillated plant fiber into a sheet.

When the cationic microfibrillated plant fiber is formed into a sheet, the concentration of the microfibrillated plant fiber in the slurry is not particularly limited. The concentration is generally about 0.1 to 2.0% by weight, and preferably about 0.2 to 0.5% by weight.

The reduced pressure of the suction filtration is generally about 10 to 60 kPa, and preferably about 10 to 30 kPa. The temperature at the suction filtration is generally about 10 to 40° C., and preferably about 20 to 25° C.

A wire mesh cloth, filter paper, or the like, can be used as a filter.

A dewatered sheet (wet web) of the cationic microfibrillated plant fiber can be obtained by the aforementioned suction filtration. The obtained dewatered sheet is immersed in a solvent bath, as required, and then hot-pressed, thereby enabling obtaining a dry sheet of the microfibrillated plant fiber.

The heating temperature in hot pressing is generally about 50 to 150° C., and preferably about 90 to 120° C. The pressure is generally about 0.0001 to 0.05 MPa, and preferably about 0.001 to 0.01 MPa. The hot pressing time is generally about 1 to 60 minutes, and preferably about 10 to 30 minutes.

The tensile strength of the sheet obtained from the cationic microfibrillated plant fiber of the present invention is generally about 90 to 200 MPa, and preferably about 120 to 200 MPa. The tensile strength of the sheet obtained from the cationic microfibrillated plant fiber of the present invention sometimes varies depending on the basis weight, density, etc., of the sheet. In the present invention, a sheet having a basis weight of 100 g/m$^2$ is formed, and the tensile strength of the sheet having a density of 0.8 to 1.0 g/cm$^3$ and obtained from the cationic microfibrillated plant fiber is measured.

The tensile strength is a value measured by the following method. A dried cationic microfibrillated plant fiber sheet that is prepared to have a basis weight of 100 g/m$^2$ is cut to form a rectangular sheet having a size of 10 mm×50 mm to obtain a specimen. The specimen is mounted on a tensile tester, and the stress and strain applied to the specimen are measured while a load is applied. The load applied per specimen unit sectional area when the specimen is ruptured is referred to as "tensile strength."

The tensile elastic modulus of the sheet obtained from the cationic microfibrillated plant fiber of the present invention is generally about 6.0 to 8.0 GPa, and preferably about 7.0 to 8.0 GPa. The tensile elastic modulus of the sheet obtained from the cationic microfibrillated plant fiber of the present invention sometimes varies depending on the basis weight, density, etc., of the sheet. In the present invention, a sheet having a basis weight of 100 g/m² is formed, and the tensile elastic modulus of the sheet having a density of 0.8 to 1.0 g/cm³ and obtained from the cationic microfibrillated plant fiber is measured. The tensile strength is a value measured by the following method.

The cationic microfibrillated plant fiber of the present invention can be mixed with various resins to form a resin composite.

The resin is not particularly limited. For example, thermosetting resins, such as phenolic resin, urea resin, melamine resin, unsaturated polyester resin, epoxy resin, diallyl phthalate resin, polyurethane resin, silicone resin, and polyimide resin, can be used. These resins may be used singly or in a combination of two or more. Preferred are phenolic resins, epoxy resins, and unsaturated polyester resins.

The method of forming a composite of a cationic microfibrillated plant fiber and a resin is not particularly limited, and a general method of forming a composite of a cationic microfibrillated plant fiber and a resin can be used. Examples thereof include a method in which a sheet or a molded article formed of a cationic microfibrillated plant fiber is sufficiently impregnated with a resin monomer liquid, followed by polymerization using heat, UV irradiation, a polymerization initiator, etc.; a method in which a cationic microfibrillated plant fiber is sufficiently impregnated with a polymer resin solution or resin powder dispersion, followed by drying; a method in which a cationic microfibrillated plant fiber is sufficiently dispersed in a resin monomer liquid, followed by polymerization using heat, UV irradiation, a polymerization initiator, etc.; a method in which a cationic microfibrillated plant fiber is sufficiently dispersed in a polymer resin solution or a resin powder dispersion, followed by drying; and the like.

To form a composite, the following additives may be added: surfactants; polysaccharides, such as starch and alginic acid; natural proteins, such as gelatin, hide glue, and casein; inorganic compounds, such as tannin, zeolite, ceramics, and metal powders; colorants; plasticizers; flavors; pigments; fluidity adjusters; leveling agents; conducting agents; antistatic agents; UV absorbers; UV dispersants; and deodorants.

As described above, the resin composite of the present invention can be produced. The cationic microfibrillated plant fiber of the present invention has a high strength and can thus yield a resin composite with high strength. This composite resin can be molded like other moldable resins, and the molding can be performed by, for example, hot pressing in a mold. Molding conditions of resin appropriately adjusted, as required, can be used in the molding.

The resin composite of the present invention has high mechanical strength, and can thus be used, for example, not only in fields where known microfibrillated plant fiber molded articles and known microfibrillated plant fiber-containing resin molded articles are used, but also in fields that require higher mechanical strength (tensile strength, etc.). For example, the resin composite of the present invention can be effectively applied to interior materials, exterior materials, and structural materials of transportation vehicles such as automobiles, trains, ships, and airplanes; the housings, structural materials, and internal parts of electrical appliances such as personal computers, televisions, telephones, and watches; the housings, structural materials, and internal parts of mobile communication devices such as mobile phones; the housings, structural materials, and internal parts of devices such as portable music players, video players, printers, copiers, and sporting equipment; building materials; and office supplies such as writing supplies.

DESCRIPTION OF EMBODIMENTS

The present invention is described in further detail with reference to Examples and Comparative Examples. The scope of the invention is, however, not limited to these Examples.

EXAMPLE 1

A slurry of softwood unbleached kraft pulp (NUKP) (an aqueous suspension with a pulp slurry concentration of 2% by weight) was passed through a single-disk refiner (produced by Kumagai Riki Kogyo Co., Ltd.) and repeatedly subjected to refiner treatment until a Canadian standard freeness (CSF) value of 100 mL or less was achieved. The obtained slurry was dehydrated and concentrated using a centrifugal dehydrator (produced by Kokusan Co., Ltd.) at 2,000 rpm for 15 minutes to a pulp concentration of 25% by weight. Subsequently, 60 parts by dry weight of the above-mentioned pulp, 30 parts by weight of sodium hydroxide, and 2,790 parts by weight of water were introduced into an IKA stirrer whose rotation number had been adjusted to 800 rpm, and the resulting mixture was stirred at 30° C. for 30 minutes. Thereafter, the temperature was increased to 80° C., and 375 parts by weight of 3-chloro-2-hydroxypropyltrimethylammonium chloride (CTA) on an active component basis was added thereto as a cationization agent. After the reaction was conducted for 1 hour, the reaction product was separated, neutralized, washed, and concentrated to thereby obtain a cationically modified pulp having a concentration of 25% by weight. Table 1 shows the degree of cationic substitution of the cationically modified pulp.

After the lignin content (% by weight) in the sample was measured by the Klason method, the degree of cationic substitution was calculated by measuring the nitrogen content (% by weight) of the sample by elemental analysis and using the following formula. The term "degree of substitution" used herein refers to the average value of the number of moles of substituent per mol of an anhydrous glucose unit.

$$\text{Degree of Cationic Substitution} = (162 \times N) / \{(1400 - 151.6 \times N) \times (1 - 0.01 \times L)\}$$

N: Nitrogen content (% by weight)
L: Lignin content (% by weight)

The obtained cationically modified pulp was introduced into a twin-screw kneader (KZW, produced by Technovel Corporation) and subjected to defibration treatment. The defibration was performed using a twin-screw kneader under the following conditions.
[Defibration Conditions]
Screw diameter: 15 mm
Screw rotation speed: 2,000 rpm (screw circumferential speed: 94.2 m/min.)
Defibration time: 150 g of cationically modified pulp was subjected to defibration treatment under the conditions of 500 g/hr to 600 g/hr. The time from introducing the starting material to obtaining microfibrillated plant fibers was 15 minutes.

L/D: 45
Number of times defibration treatment was performed: once (1 pass)
Number of blocking structures: 0

Subsequently, water was added to the cationic microfibrillated plant fiber slurry obtained through defibration, and the concentration of the cationically modified microfibrillated plant fiber was adjusted to 0.33% by weight. The temperature of the slurry was adjusted to 20° C. After 600 mL of the slurry was placed into a jar and stirred with a stirring rod, filtration under reduced pressure (using a 5A filter paper produced by Advantec Toyo Kaisha, Ltd.) was promptly initiated. The obtained wet web was hot-pressed at 110° C. under a pressure of 0.003 MPa for 10 minutes, thereby obtaining a cationic microfibrillated plant fiber sheet of 100 g/m². The tensile strength of the obtained sheet was measured. Table 1 shows the lignin content, the degree of cationic substitution, and each property value of the dry sheet. The method of measuring the tensile strength is as described above.

EXAMPLE 2

A dry sheet was produced by carrying out cationic modification as described in Example 1, except that softwood bleached kraft pulp (NBKP) was used as the pulp, CTA was used in an amount of 180 parts by weight, and water was used in an amount of 2,730 parts by weight. Table 1 shows the lignin content, the degree of cationic substitution, and each property value of the dry sheet.

EXAMPLE 3

A dry sheet was produced by carrying out cationic modification as described in Example 2, except that glycidyl trimethyl ammoniumchloride (GTA) was used as a cationization agent in place of CTA. Table 1 shows the lignin content, the degree of cationic substitution, and each property value of the dry sheet.

Figure 1:
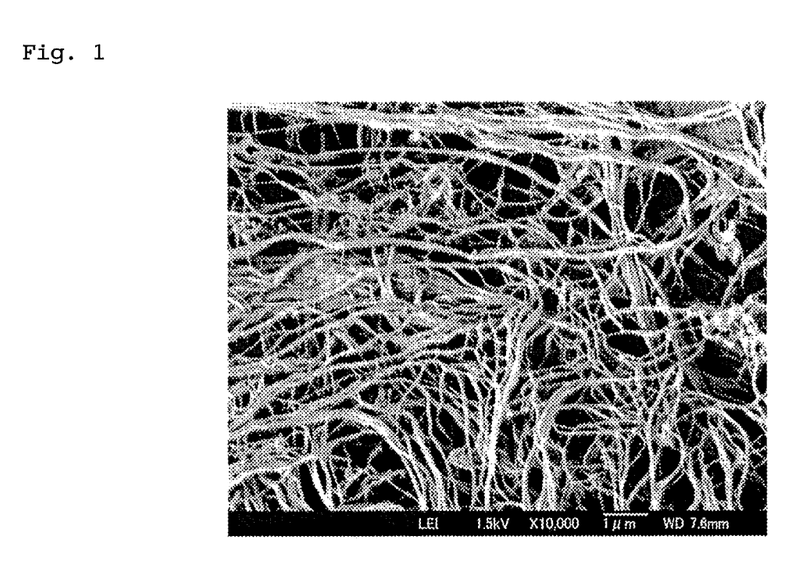
FIG. 1 is an electron microscope photograph of the cationic microfibrillated plant fiber obtained in Example 3 (magnification: ×10,000).
Figure 2:
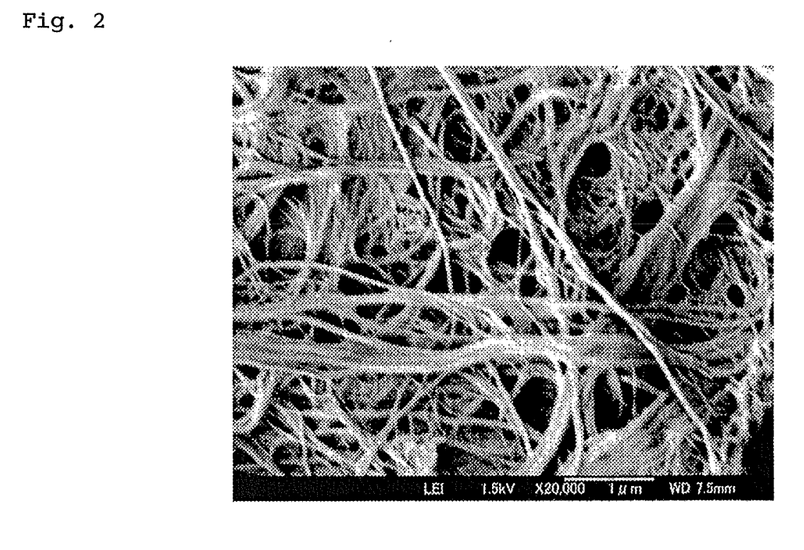
FIG. 2 is an electron microscope photograph of the cationic microfibrillated plant fiber obtained in Example 3 (magnification: ×20,000).

FIGS. 1 and 2 are electron microscope photographs of the cationic microfibrillated plant fiber obtained in Example 3. The diameters of 100 arbitrary cationic microfibrillated plant fibers shown in the SEM image at 10,000× magnification of FIG. 1 were measured; the number average fiber diameter was 87.02 nm. Further, the diameters of 50 arbitrary cationic microfibrillated plant fibers shown in the SEM image at 20,000× magnification of FIG. 2 were measured; the number average fiber diameter was 96.83 nm.

EXAMPLE 4

A cationically modified microfibrillated plant fiber having a degree of cationic substitution of 0.185 was obtained by carrying out cationic modification as described in Example 2, except that sodium hydroxide was used in an amount of 7 parts by weight, GTA was used in an amount of 120 parts by weight, IPA was used in an amount of 2352 parts, and water was used in an amount of 588 parts.

Figure 3:
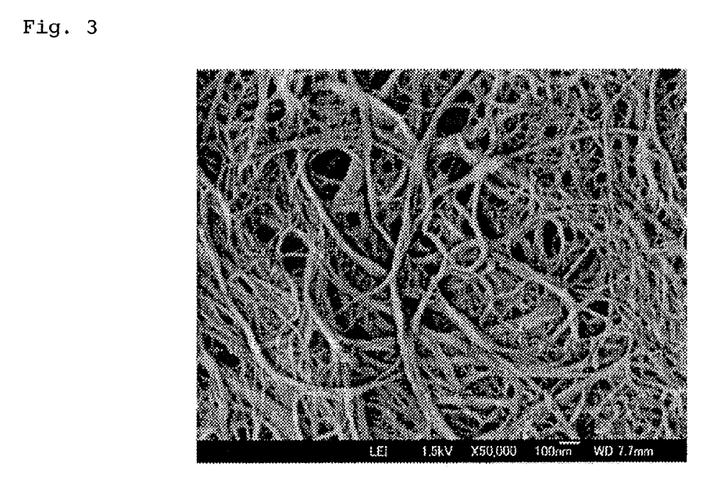
FIG. 3 is an electron microscope photograph of the cationic microfibrillated plant fiber obtained in Example 4 (magnification: ×50,000).

FIG. 3 is an electron microscope photograph of the cationic microfibrillated plant fiber obtained in Example 4. The diameters of 100 arbitrary cationic microfibrillated plant fibers shown in the SEM image at 50,000× magnification of FIG. 3 were measured; the number average fiber diameter was 57.79 nm.

COMPARATIVE EXAMPLE 1

A dry sheet was produced by carrying out cationic modification as described in Example 3, except that, at the time of cationic modification, CTA was added in an amount of 60 parts by weight, and water was added in an amount of 2,850 parts by weight. Table 1 shows the lignin content, the degree of cationic substitution, and each property value of the dry sheet.

Figure 4:
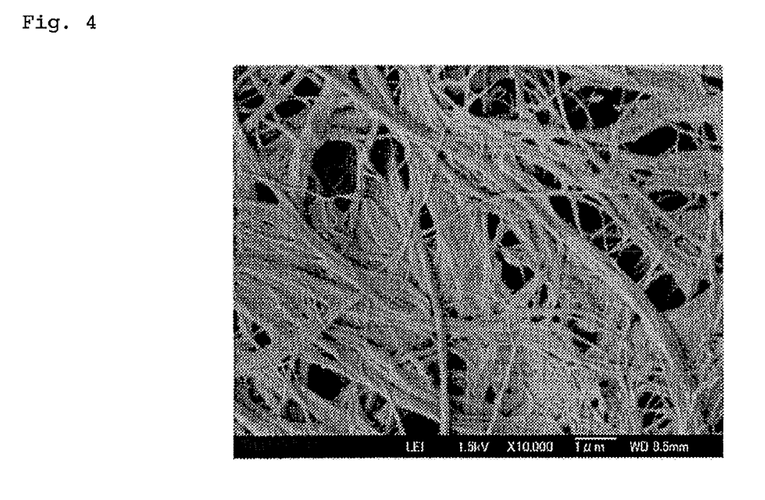
FIG. 4 is an electron microscope photograph of the cationic plant fiber obtained in Comparative Example 1 (magnification: ×10,000).

FIG. 4 is an electron microscope photograph of the cationic plant fiber obtained in Comparative Example 1. The diameters of 50 arbitrary cationic plant fibers shown in the SEM image at 10,000× magnification of FIG. 4 were measured; the number average fiber diameter was 354.3 nm. This differs from the average diameter of the cationic microfibrillated plant fiber of the present invention, which is about 4 to 200 nm.

COMPARATIVE EXAMPLE 2

A dry sheet was produced as described in Example 1, except that cationic modification was not carried out. Table 1 shows the lignin content and each property value of the dry sheet.

COMPARATIVE EXAMPLE 3

A cationically modified plant fiber was obtained as described in Example 3, except that a twin-screw defibration treatment was not performed after cationic modification. Table 1 shows the lignin content, the degree of cationic substitution, and each property value of the dry sheet.

COMPARATIVE EXAMPLE 4

Figure 5:
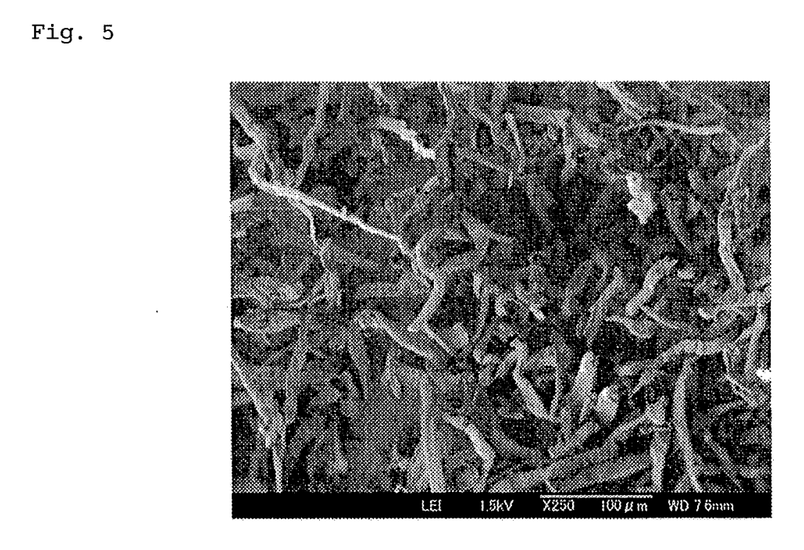
FIG. 5 is an electron microscope photograph of the cationic plant fiber obtained in Comparative Example 4 (magnification: ×250).

Cationic modification was carried out as described in Example 3, except that a commercially available cellulose powder (KC Flock W-100G; average particle diameter: 37 μm; produced by Nippon Paper Chemicals Co., Ltd.) was used, and neutralization, dehydration, and drying were then performed. The dried product was crushed using a hammer mill, thereby obtaining a cationically modified plant fiber having a degree of cationic substitution of 0.052 and an average particle diameter of 35 μm. FIG. 5 is an electron microscope photograph of Comparative Example 4. The diameters of 50 arbitrary cationic plant fibers shown in the SEM image at 250× magnification of FIG. 5 were measured; the average diameter of the cationic plant fiber was 13.31 μm. This differs from the average diameter of the cationic microfibrillated plant fiber of the present invention, which is about 4 to 200 nm. Comparative Example 4 is a repetition of the Example of Japanese Unexamined Patent Publication No. 2002-226501.

TABLE 1

| | Cationization Agent/ Proportion (relative to pulp) | Lignin Content (%) | Degree of Cationic Substitution | Tensile Strength of Sheet (MPa) | Tensile Elastic Modulus of Sheet (GPa) |
|---|---|---|---|---|---|
| Ex. 1 | CTA/625% | 6.0 | 0.032 | 128 | 7.1 |
| Ex. 2 | CTA/300% | 0.0 | 0.031 | 141 | 6.9 |
| Ex. 3 | GTA/300% | 0.0 | 0.048 | 139 | 6.9 |
| Comp. Ex. 1 | CTA/100% | 0.0 | 0.021 | 79 | 4.8 |
| Comp. Ex. 2 | — | | | 76 | 5.4 |
| Comp. Ex. 3 | GTA/300% | 0.0 | 0.052 | 79 | 5.5 |

As is clear from the results of Comparative Example 3, the cationically modified plant fiber sheet obtained without performing double-screw defibration after the treatment with GTA/300% had a strength and an elastic modulus of 79 MPa and 5 GPa, respectively, which are almost equal to those of untreated products. A comparison of the results of Example 3 and Comparative Examples 2 and 3 confirms the following: when the pulp (NBKP) is only treated with GTA, the tensile strength of the sheet does not improve, whereas when double-screw defibration is carried out after GTA treatment, the tensile strength of the sheet remarkably improves.

EXAMPLE 5

The aqueous suspension of the cationic microfibrillated plant fiber produced in Example 2 was filtrated to obtain a wet web of the cationically modified microfibrillated plant fiber. This wet web was immersed in an ethanol bath for 1 hour and then hot-pressed at 110° C. under a pressure of 0.003 MPa for 10 minutes, thereby obtaining a bulky sheet of the cationically modified microfibrillated plant fiber. The filtration conditions were as follows:

Filtration area: about 200 cm$^2$
Reduced pressure: −30 kPa
Filter paper: 5A filter paper, produced by Advantec Toyo Kaisha, Ltd.

Subsequently, the obtained bulky sheet of the cationic microfibrillated plant fiber was cut to a size of 30 mm wide× 40 mm long, dried at 105° C. for 1 hour, and the weight was measured.

The sheet was then immersed in a resin solution prepared by adding 1 part by weight of benzoyl peroxide (Nyper FF, produced by NOF Corporation) to 100 parts by weight of an unsaturated polyester resin (SUNDHOMA FG-283, produced by DH Material Inc.). The immersion was performed under reduced pressure (vacuum: 0.01 MPa; time: 30 minutes), thereby obtaining a sheet impregnated with unsaturated polyester resin. Subsequently, several identical sheets impregnated with unsaturated polyester resin were overlaid so that the molded article had a thickness of about 1 mm. After removing excess resin, the sheets were placed in a mold and hot-pressed (at 90° C. for 30 minutes) to obtain an unsaturated polyester composite molded product of the cationically modified microfibrillated plant fiber. The weight of the obtained molded product was measured, and the fiber content (% by weight) was calculated from the difference between the weight of the molded product and the dry weight of the sheet.

The length and width of the molded product were accurately measured with a caliper (produced by Mitutoyo Corporation). The thickness was measured at several locations using a micrometer (produced by Mitutoyo Corporation), and the volume of the molded product was calculated. The weight of the molded product was measured separately. The density was calculated from the obtained weight and volume.

A sample having a thickness of 1.2 mm, a width of 7 mm, and a length of 40 mm was produced from the molded product. The flexural modulus and flexural strength of the sample were measured at a deformation rate of 5 mm/min (load cell: 5 kN). An Instron Model 3365 universal testing machine (produced by Instron Japan Co., Ltd.) was used as a measuring device. Table 2 shows the fiber content, flexural modulus, and flexural strength of the obtained resin composite.

EXAMPLE 6 AND COMPARATIVE EXAMPLES 5 TO 7

Molded products of Example 6 and Comparative Examples 5 to 7 were obtained as described in Example 5, except that the cationic microfibrillated plant fiber obtained in Example 3, the cationically modified pulp obtained in Comparative Example 1, the microfibrillated plant fiber without cationic modification obtained in Comparative Example 2, and the cationically modified pulp obtained in Comparative Example 3 were respectively used. Table 2 shows the fiber content, flexural modulus, and flexural strength of each resin composite obtained in Example 6 and Comparative Examples 5 to 7.

TABLE 2

| | | Pretreatment | | Unsaturated Polyester Resin Composite | | |
|---|---|---|---|---|---|---|
| | Plant Fiber | Cationization Agent/Proportion (relative to pulp) | Degree of Substitution | Fiber Content (%) | Flexural Modulus (GPa) | Flexural Strength (MPa) |
| Ex. 5 | Ex. 2 | CTA/300% | 0.031 | 51.8 | 9.6 | 198 |
| Ex. 6 | Ex. 3 | GTA/300% | 0.048 | 56.4 | 9.9 | 222 |
| Comp. Ex. 5 | Comp. Ex. 1 | CTA/100% | 0.021 | 66.4 | 5.7 | 120 |
| Comp. Ex. 6 | Comp. Ex. 2 | — | | 58.3 | 6.6 | 140 |
| Comp. Ex. 7 | Comp. Ex. 3 | GTA/300% | 0.052 | 57.6 | 3.1 | 101 |

EXAMPLE 7 AND COMPARATIVE EXAMPLE 8

The dry sheet of the cationic microfibrillated plant fiber obtained in Example 3 and the dry sheet of the microfibrillated plant fiber obtained in Comparative Example 2 were dried at 105° C. for 1 hour, and each weight was measured.

Subsequently, these dry sheets were immersed (0.3 MPa) in a methanol solution (10% by weight) of phenolic resin (Phenolite IG-1002, produced by DIC Corporation), predried at room temperature, and vacuum-dried at 50° C. for another 6 hours; thus, a dry sheet impregnated with phenolic resin was obtained, and the weight was measured. The fiber content (% by weight) was calculated from the difference between the dry weights before and after the resin impregnation.

Each of the obtained dry sheets impregnated with phenolic resin was cut into a size of 30 mm wide×40 mm long. Then, several identical sheets were overlaid, placed in a mold, and hot-pressed (at 160° C. for 30 minutes under a pressure of 100 MPa), thereby obtaining a molded product of a composite of the cationic microfibrillated plant fiber and phenolic resin, as well as a molded product of a composite of the non-cationized microfibrillated plant fiber and phenolic resin.

The length and width of each of the molded products were accurately measured with a caliper (produced by Mitutoyo Corporation). The thickness was measured at several locations using a micrometer (produced by Mitutoyo Corporation), and the volume of each molded product was calculated. The weight of each molded product was measured separately. The density was calculated from the obtained weight and volume.

A sample having a thickness of about 1.6 mm, a width of 7 mm, and a length of 40 mm was produced from each of the molded products, and the flexural modulus and flexural strength of each sample were measured at a deformation rate of 5 mm/min (load cell: 5 kN). An Instron Model 3365 universal testing machine (produced by Instron Japan Co., Ltd.) was used as a measuring device. Table 3 shows the fiber content, flexural modulus, and flexural strength of each of the obtained resin composites.

TABLE 3

| | Plant Fiber | Pretreatment | | Phenolic Resin Composite | | |
|---|---|---|---|---|---|---|
| | | Cationization Agent/Proportion (relative to pulp) | Degree of Substitution | Fiber Content (%) | Flexural Modulus (GPa) | Flexural Strength (MPa) |
| Ex. 7 | Ex. 3 | GTA/300% | 0.048 | 81.1 | 16.9 | 256 |
| Comp. Ex. 8 | Comp. Ex. 2 | — | | 80.9 | 13.3 | 238 |

The invention claimed is:

1. A method for manufacturing a microfibrillated cellulose fiber cationically modified with a quaternary-ammonium-group-containing compound, the microfibrillated cellulose fiber cationically modified with a quaternary-ammonium-group-containing compound having a degree of substitution of quaternary ammonium groups of not less than 0.03 to less than 0.4 per anhydrous glucose unit and an average diameter of 4 to 200 nm, the method comprising the steps of:

(1) reacting hydroxyl groups in a material containing a cellulose fiber with a quaternary-ammonium-group-containing cationization agent to cationically modify the material containing a cellulose fiber to form a cationically modified cellulose-fiber-containing material, and (2) defibrating the cationically modified cellulose-fiber-containing material from step (1), in a mixture with water to an extent that a fiber average diameter becomes 4 to 200 nm by using a twin-screw kneader, wherein the lower limit of the screw circumferential speed of the twin-screw kneader is 45 m/min, and and wherein the proportion of the cationically modified cellulose-fiber-containing material from step (1) in the mixture subjected to defibration is 10%-70% by weight, and the method not comprising, between step (1) and step (2), a step of drying the cationically modified cellulose-fiber-containing material.

2. The manufacturing method according to claim 1, wherein the microfibrillated cellulose fiber cationically modified with a quaternary-ammonium-group-containing compound has a degree of substitution of quaternary ammonium groups of 0.03 to 0.048 per anhydrous glucose unit.

3. The manufacturing method according to claim 1, wherein the microfibrillated cellulose fiber cationically modified with a quaternary-ammonium-group-containing compound has a degree of Cellulose I crystallinity of 60% or more.

4. The manufacturing method according to claim 1, wherein the microfibrillated cellulose fiber cationically modified with a quaternary-ammonium-group-containing compound contains lignin in an amount of 0 to 40% by weight.

5. The manufacturing method according to claim 1, wherein in step (1), the cationically modified cellulose-fiber-containing material and the cationization agent are used in proportions such that the cationization agent is used in an amount of 10 to 1,000 parts by weight per 100 parts by weight of the material containing a cellulose fiber.

* * * * *